(12) United States Patent
Wang et al.

(10) Patent No.: US 10,951,574 B2
(45) Date of Patent: Mar. 16, 2021

(54) TARGET OBJECT SELECTION METHOD, SERVER, AND COMPUTER STORAGE MEDIUM

(71) Applicant: TENCENT TECHNOLOGY (SHENZHEN) COMPANY LIMITED, Shenzhen (CN)

(72) Inventors: Sheng Wang, Shenzhen (CN); Ken Lin, Shenzhen (CN); Tongqing Jiang, Shenzhen (CN); Haizheng Zhang, Shenzhen (CN); Meifei Ren, Shenzhen (CN); Hongyu Shen, Shenzhen (CN); Yuan Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/282,044

(22) Filed: Feb. 21, 2019

(65) Prior Publication Data
US 2019/0190880 A1    Jun. 20, 2019

Related U.S. Application Data

(63) Continuation of application No. PCT/CN2017/108019, filed on Oct. 27, 2017.

(30) Foreign Application Priority Data

Oct. 31, 2016   (CN) .......................... 201610933749.0

(51) Int. Cl.
H04W 4/02      (2018.01)
H04L 12/58     (2006.01)
(Continued)

(52) U.S. Cl.
CPC ............. *H04L 51/32* (2013.01); *G06Q 50/01* (2013.01); *H04L 29/08* (2013.01); *H04L 67/18* (2013.01);
(Continued)

(58) Field of Classification Search
CPC ......... H04L 51/32; H04L 67/26; H04L 29/08; H04L 67/306; H04L 67/18; H04W 4/021;
(Continued)

(56) References Cited

U.S. PATENT DOCUMENTS

2013/0006738 A1   1/2013  Horvitz et al.
2016/0165002 A1*  6/2016  LeBeau .................. G06Q 50/01
                                                              709/204
(Continued)

FOREIGN PATENT DOCUMENTS

CN    103618824 A    3/2014
CN    103635923 A    3/2014
(Continued)

OTHER PUBLICATIONS

The World Intellectual Property Organization (WIPO) International Search Report for PCT/CN2017/108019 dated Dec. 21, 2017 5 Pages (including translation).
(Continued)

*Primary Examiner* — Marcos L Torres
(74) *Attorney, Agent, or Firm* — Anova Law Group, PLLC

(57)   ABSTRACT

A target object selection method, a server, and a computer storage medium are disclosed. The method includes selecting a first one candidate user meeting a first condition in a target area, the first condition characterizing a user who has appeared in the target area; extracting a first social relationship chain of the at least one candidate user in the target area, the social relationship chain comprising a first related user
(Continued)

---

101
Select at least one candidate user meeting a first preset condition in a target area 102
Extract a social relationship chain of the at least one candidate user in the target area 103
Select at least one target user from the target area based on the social relationship chain of the at least one candidate user, so as to send information to the at least one target user in the target area who has a social relationship with the candidate user; and selecting a first one target user in the target area based on the first social relationship chain and sending information to the first target user.

17 Claims, 7 Drawing Sheets

(51) Int. Cl.

| | | |
|---|---|---|
| *H04L 29/08* | (2006.01) | |
| *G06Q 50/00* | (2012.01) | |
| *H04W 8/26* | (2009.01) | |
| *H04W 64/00* | (2009.01) | |
| *H04W 4/12* | (2009.01) | |
| *H04W 4/021* | (2018.01) | |

(52) U.S. Cl.
CPC ............ *H04L 67/26* (2013.01); *H04L 67/306* (2013.01); *H04W 4/02* (2013.01); *H04W 4/021* (2013.01); *H04W 4/023* (2013.01); *H04W 4/025* (2013.01); *H04W 4/12* (2013.01); *H04W 8/26* (2013.01); *H04W 64/003* (2013.01)

(58) Field of Classification Search
CPC ......... H04W 4/02; H04W 4/12; H04W 4/023; H04W 64/003; H04W 8/26; H04W 4/025; G06Q 50/01
See application file for complete search history.

(56) References Cited

U.S. PATENT DOCUMENTS

| | | | |
|---|---|---|---|
| 2018/0089709 A1* | 3/2018 | Rousseau-Villella | ........................ G06Q 30/0224 |
| 2018/0130151 A1 | 5/2018 | Kucic | |

FOREIGN PATENT DOCUMENTS

| | | |
|---|---|---|
| CN | 105357636 A | 2/2016 |
| CN | 105554140 A | 5/2016 |
| CN | 105592414 A | 5/2016 |
| WO | 2016093831 A1 | 6/2016 |

OTHER PUBLICATIONS

The State Intellectual Property Office of the People's Republic of China (SIPO) Office Action 1 for 201610933749.0 dated Oct. 31, 2019 8 Pages (including translation).

* cited by examiner

TARGET OBJECT SELECTION METHOD, SERVER, AND COMPUTER STORAGE MEDIUM

RELATED APPLICATION

This application claims priority to Chinese Patent Application No. 201610933749.0, filed on Oct. 31, 2016, entitled "TARGET OBJECT SELECTION METHOD, SERVER, AND COMPUTER STORAGE MEDIUM," and PCT Application No. PCT/CN2017/108019, filed on Oct. 27, 2017, entitled "TARGET OBJECT SELECTION METHOD, SERVER, AND COMPUTER STORAGE MEDIUM." Both applications are incorporated by reference in the entirety.

FIELD OF THE TECHNOLOGY

The present application relates to an information processing technology in the field of information processing, and more particularly to a target object selection method, a server, and a computer storage medium.

BACKGROUND OF THE DISCLOSURE

Currently, a network server can obtain relevant information of users such as location information of users, classify the users, and deliver information for some users in a target area after location-based user classification. However, it is likely that users cannot be accurately classified. As such information delivered may not meet user needs, thus produces poor user experience.

SUMMARY

The present application provides a target object selection method, a server, and a computer storage medium, which can at least solve the foregoing problems in the existing technology.

The technical solution of the present application is implemented as follows.

The present application provides a target object selection method. The method includes selecting a first one candidate user meeting a first condition in a target area, the first condition characterizing a user who has appeared in the target area; extracting a first social relationship chain of the at least one candidate user in the target area, the social relationship chain comprising a first related user who has a social relationship with the candidate user; and selecting a first one target user in the target area based on the first social relationship chain and sending information to the first target user.

Another aspect of the present disclosure provides a server. The server includes a user selection unit configured to select a first candidate user meeting a first condition in a target area, the first condition characterizing a user who has appeared in the target area; a social relationship extraction unit configured to extract a first social relationship chain of the first candidate user in the target area, the first social relationship chain comprising at least one related user who has a social relationship with the first candidate user; and a target user selection unit configured to select a first target user from the target area based on the first social relationship chain of the first candidate user, and to send information to the first target user in the target area.

Another aspect of the present disclosure also provides a server. The server includes a processor configured to select at least one candidate user meeting a first condition in a target area, the first condition characterizing a user who has appeared in the target area; extract a social relationship chain of the at least one candidate user in the target area, the social relationship chain comprising at least one related user who has a social relationship with the candidate user; and select at least one target user from the target area based on the social relationship chain of the at least one candidate user, so as to send information to the at least one target user in the target area; and a communication interface, being configured to send information to the at least one target user.

Another aspect of the present disclosure also provides a server. The server includes a processor a processor, and a memory being configured to store a computer program capable of running on the processor. When running the computer program, the processor implements the method comprising: selecting a first one candidate user meeting a first condition in a target area, the first condition characterizing a user who has appeared in the target area; extracting a first social relationship chain of the at least one candidate user in the target area, the social relationship chain comprising a first related user who has a social relationship with the candidate user; and selecting a first one target user in the target area based on the first social relationship chain and sending information to the first target user.

The present application also provides a computer storage medium, storing a computer-executable instruction, the computer-executable instruction, when being executed, implementing the foregoing method steps.

DESCRIPTION OF EMBODIMENTS

The present application will be further described in detail below with reference to the accompanying drawings and specific embodiments.

Figure 1:
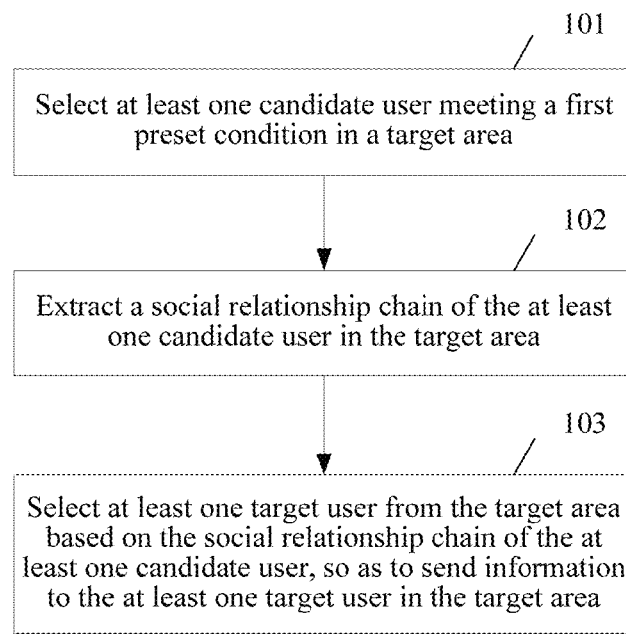
FIG. 1 is flowchart of a target object selection method in the present application.

The present application provides a target object selection method, being applied to a server. As shown in FIG. 1, the method includes the following steps:

Step S101: Select at least one candidate user meeting a first preset condition in a target area, wherein the first preset condition characterizing a user who has appeared in the target area.

Step S102: Extract a social relationship chain of the at least one candidate user in the target area, wherein the social relationship chain including at least one related user who has a social relationship with the candidate user.

Step S103: Select at least one target user from the target area based on the social relationship chain of the at least one candidate user, so as to send information to the at least one target user in the target area.

Here, the step of selecting at least one candidate user meeting a first preset condition in a target area includes: obtain at least one piece of location information reported by each user in at least one user through a mobile terminal within a first preset duration; determine whether the user appears within the target area or not based on the at least one piece of location information corresponding to each of the users; and determine that the user is a candidate user meeting the first preset condition if the user appears within the target area.

The step of obtaining at least one location where each user in at least one user has resided within a first preset duration may be: receiving at least one piece of location information sent by each of the users through the mobile terminal within the first preset duration, and taking a location corresponding to the at least one piece of location information as at least one location where the user has resided within the first preset duration.

Specifically, at least one piece of location information sent by the user through the mobile terminal may be obtained by location based service (LBS), the LBS acquires location information (which may, for example, include longitude and latitude coordinates) of a user of a mobile terminal through a mobile operator network (i.e., a GSM network, or a CDMA network). At this time, a corresponding user identity obtained by a computer network may be an international mobile equipment identity (IMEI).

The first preset duration may be a duration set according to an actual situation. For example, the first preset duration may be 10 days or may be 1 month. In other words, location information received within this period of time and reported by the user is obtained, and locations where the user has appeared within this duration are determined according to these pieces of location information.

Figure 2:
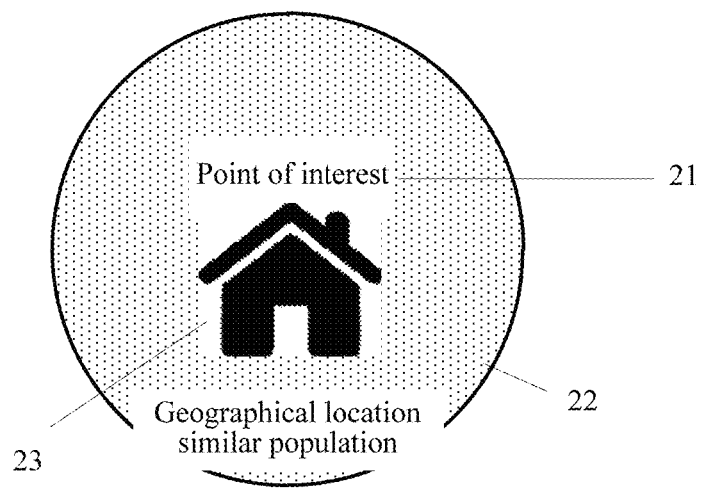
FIG. 2 is a diagram of a target area in the present application.

The foregoing target area may be a target area set by a manager according to a place of concern of the manager. The place of concern of the manager may be referred to as a POI: POI is an abbreviation of "Point of Interest", which is an information point of interest. Each POI may contain the following four aspects of information: location name, category, longitude and latitude of a location, and nearby shops. It will be appreciated that the longitude and latitude of a location in the target area may be a center point of the target area, such as, referring to FIG. 2, a center point 21 of a POI in FIG. 2. In addition, a certain coverage range can also exist, such as a coverage range 22 in the figure. A target shop 23 may also be provided in the coverage range.

Determining whether the user appears within the target area or not based on the at least one piece of location information corresponding to each of the users, and if the user appears within the target area, it is determined that the user is a candidate user meeting the first preset condition.

The operation may be: comparing the at least one piece of location information with the coverage range of the target area, and if a piece of location information is within the coverage range of the target area, determining that the user appears within the target area. For example, referring to FIG. 3, a coverage range of a target area is 30, a user A reports 5 pieces of location information through a mobile terminal, namely locations 1 to 5. It can be seen from FIG. 3 that the locations 1 and 3 in the location information reported by the user A are within the coverage range 30, so it is determined that the user A is a candidate user.

The manner of selecting a candidate user is described in detail below based on a social relationship chain. The step of selecting at least one target user from the target area based on the social relationship chain of the at least one candidate user includes: extract candidate users from the at least one candidate user one by one, select a corresponding social relationship chain of the candidate user in at least one application, determine at least one related user based on the social relationship chain of the candidate user in the at least one application, and select a target user from the at least one related user based on at least one candidate user other than the extracted candidate users.

The social relationship chain is at least one related user who has a social relationship with the candidate user. The social relationship may be one or more types of social relationships designated by a manager. For example, a user may have a friendship with colleagues, classmates, girlfriends, etc. The manager may follow up on the "colleagues" relationship. That is, the social relationship is designated as a colleague relationship.

The manner of obtaining a social relationship of a user may include: obtaining a tag set by a user for his/her friend, that is, taking the tag as a social relationship between the user and the friend; or, taking, according to a friend group in which a user joins in an application currently, the category of the friend group as a social relationship of the user.

Specifically, a candidate user stores an IMEI of the user on a server side, and when reporting LBS thereof, the candidate user reports the LBS and the IMEI associatively, that is, the server side can obtain the IMEI of the user while obtaining the LBS of the candidate user. Further, the server side also stores a corresponding account of the user when logging in at least one social application based on the IMEI of the user, and thus a corresponding social relationship chain of the user in at least one application can be known. For example, referring to FIG. 4, when a user A is at a location 1, the user reports the location 1 and the LBS of the user A and carries an IMEI to a server side. The server side determines, based on the IMEI of the user A, an application 1 in which the user A registers or logs, and acquires a friend relationship of the user A in the application 1, particularly at least one friend who has a target social relationship with the user, these friends being based on at least one related user of the candidate user A.

Further, the process of selecting a target user may include: comparing the selected related user with candidate users, wherein the related user among the candidate users may be taken as a candidate user.

Figure 5:
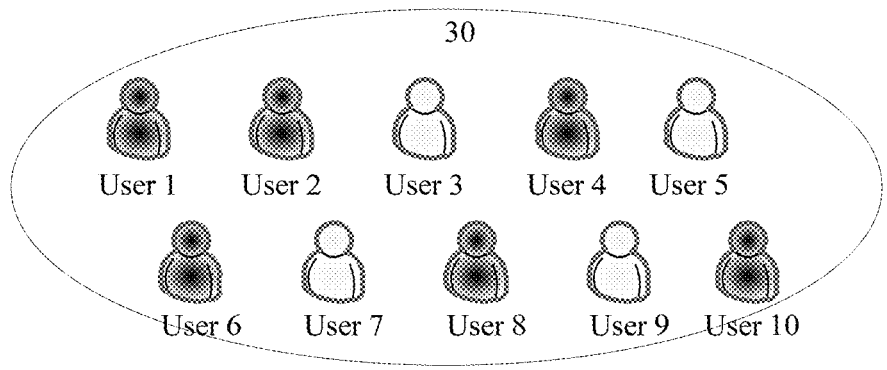
FIG. 5 is a schematic diagram of selecting a target user within a target area in the present application.

For example, referring to FIG. 5, candidate users within the target area 30 are users 1 to 10. The user 1 is taken as an example. The user 1 has multiple related users, the candidate users 2, 4, 6, and 10 among the candidate users 2 to 10 are intersected with the related users of the user 1, and so on, target users selected from the candidate users 1 to 10 may be the users 1, 2, 4, 6, 8 and 10.

Further, the users who have more social relationships are selected from the foregoing target users as final target users as follows.

The step of selecting a corresponding social relationship chain of the candidate user in at least one application, determining at least one related user based on the social relationship chain of the candidate user in the at least one application and selecting a target user from the at least one related user based on at least one candidate user other than the extracted candidate users may specifically include: take the extracted candidate users as vertexes; extract a social relationship chain in at least one application for the extracted candidate users, select at least one related user who has a social relationship with the candidate users based on the social relationship chain, and select a user, matching with the at least one candidate user, in the at least one related user as a first target user; take the at least one first target user as at least one related vertex, establish a connection with the vertex, take the connection as at least one edge, and so on, until at least one connection relationship which is established based on the social relationship chain of all candidate users and has at least one vertex and at least one corresponding edge is completed; and select a connection relationship in which the total number of vertexes and related vertexes exceeds a preset number threshold value from the at least one connection relationship, and take a first target user corresponding to the vertexes and the related vertexes in the selected connection relationship as the at least one target user.

Figure 6:
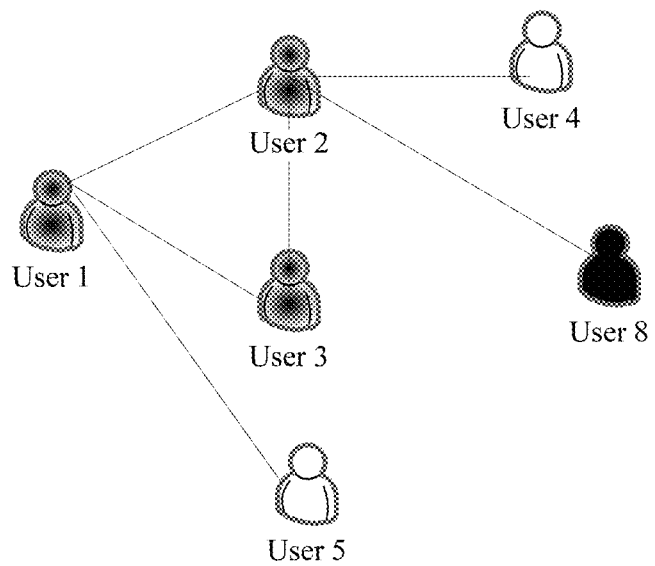
FIG. 6 is a schematic connection diagram of a social relationship of a user in the present application.

For example, referring to FIG. 6, an extracted candidate user 1 is taken as a vertex, the candidate user 1 has related users with a social relationship, multiple first target users, namely users 2, 3 and 5, are selected from the related users based on other candidate users, a connection relationship is established between the users 2, 3 and 5 and the vertex respectively, and the users and the vertex are connected to form multiple edges. The user 2 is then taken as a vertex, and also has multiple first target users, namely users 3, 4 and 8, which establishes a connection relationship with the user 2 to form multiple edges, and so on, so as to obtain connection relationships obtained by taking the users 1 to 8 as a vertex separately. After multiple connection relationships are obtained, a connection relationship in which the number of vertexes exceeds a preset number threshold value is selected, and all first target users in the selected connection relationship are taken as final selected target users.

Thus, it is possible to obtain target users in a closer social relationship to deliver information to.

The present embodiment further extends to obtain more extended users having the same social relationship based on the social relationship of the selected target user, which specifically includes: select, based on at least one target user and a social relationship chain of the at least one target user in at least one application, extended users who have a social relationship with the target user; compare the extended users with the at least one candidate user, select at least one extended user different from the candidate user as an extended target user, and send information to the extended target user.

It should be pointed out that the manner of selecting the extended users based on a social relationship of a target user is the same as the foregoing manner, and no further details are provided herein. When the extended users are further compared with candidate users, an extended user different from the candidate users is selected as an extended target user during user selection.

Because the extended user cannot be acquired by reporting a location, the user may be extended by having a social relationship with the target user. Thus, after the target user is determined, the extended user whose social relationship meets the requirement can be further extended. Thus, the demand of user extension can be met.

It can be seen that by adopting the foregoing solution, a candidate user within a target area can be selected based on the location of a user, and a target user who has a social relationship is selected according to a social relationship chain of the candidate user, so as to send information to the selected target user. Thus, the target user can be selected within the target area based on the social relationship, thereby ensuring the accurate determination of a user group and improving the accuracy of information delivery.

The present application provides a target object selection method, being applied to a server. As shown in FIG. 1, the method includes the following steps.

Step S101: Select at least one candidate user meeting a first preset condition in a target area, wherein the first preset condition characterizing a user who has appeared in the target area.

Step S102: Extract a social relationship chain of the at least one candidate user in the target area, wherein the social relationship chain including at least one related user who has a social relationship with the candidate user.

Step S103: Select at least one target user from the target area based on the social relationship chain of the at least one candidate user, so as to send information to the at least one candidate user in the target area.

Here, the step of selecting at least one candidate user meeting a first preset condition in a target area includes: obtain at least one piece of location information reported by each user in at least one user through a mobile terminal within a first preset duration; determine whether the user appears within the target area or not based on the at least one piece of location information corresponding to each of the users; and determine that the user is a candidate user meeting the first preset condition if the user appears within the target area.

The step of obtaining at least one location where each user in at least one user has resided within a first preset duration may be: receiving at least one piece of location information sent by each of the users through the mobile terminal within the first preset duration, and taking a location corresponding to the at least one piece of location information as at least one location where the user has resided within the first preset duration.

Specifically, at least one piece of location information sent by the user through the mobile terminal may be obtained by location based service (LBS), the LBS acquires location information (which may, for example, include longitude and latitude coordinates) of a user of a mobile terminal through a mobile operator network (i.e., a GSM network, or a CDMA network). At this time, a corresponding user identity obtained by a computer network may be an international mobile equipment identity (IMEI).

The first preset duration may be a duration set according to an actual situation. For example, the first preset duration may be 10 days or may be 1 month. In other words, location information received within this period of time and reported by the user is obtained, and locations where the user has appeared within this duration are determined according to these pieces of location information.

The foregoing target area may be a target area set by a manager according to a place of concern of the manager. The place of concern of the manager may be referred to as a POI:

POI is an abbreviation of "Point of Interest", which is an information point of interest. Each POI may contain the following four aspects of information: location name, category, longitude and latitude of a location, and nearby shops. It will be appreciated that the longitude and latitude of a location in the target area may be a center point of the target area, such as, referring to FIG. 2, a center point 21 of a POI in FIG. 2. In addition, a certain coverage range can also exist, such as a coverage range 22 in the figure. A target shop 23 may also be provided in the coverage range.

Determining whether the user appears within the target area or not based on the at least one piece of location information corresponding to each of the users, and if the user appears within the target area, it is determined that the user is a candidate user meeting the first preset condition. The operation may be: comparing the at least one piece of location information with the coverage range of the target area, and if a piece of location information is within the coverage range of the target area, determining that the user appears within the target area. For example, referring to FIG. 3, a coverage range of a target area is 30, a user A reports 5 pieces of location information through a mobile terminal, namely locations 1 to 5. It can be seen from FIG. 3 that the locations 1 and 3 in the location information reported by the user A are within the coverage range 30, so it is determined that the user A is a candidate user.

On the basis of the processes described earlier, the present embodiment describes the screening of the selected candidate users, and after determining that the user is a candidate user meeting a first preset condition, the method further includes at least one of the following steps:

Obtain a resident duration of each of the candidate users in the target area, and screen to obtain at least one candidate user whose resident duration is greater than a preset duration threshold value.

The method for screening based on a resident duration specifically includes: obtaining each resident sub-duration of each of the candidate users in the target area, and adding all the resident sub-durations to obtain a resident duration.

Figure 7:
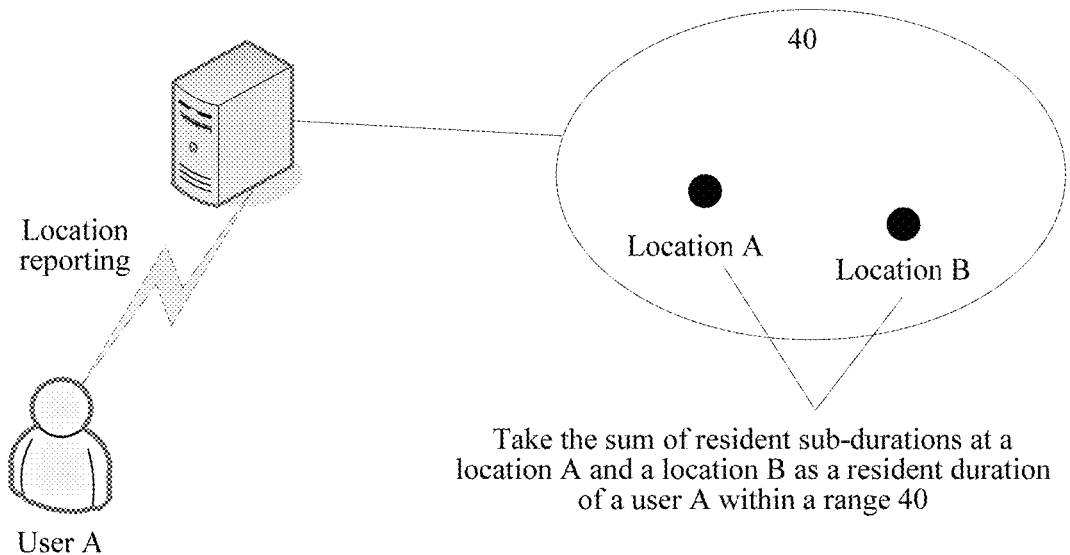
FIG. 7 is a schematic diagram of determining a resident duration of a user based on a location reported by the user in the present application.

Specifically, referring to FIG. 7, a user A appears within a target area 40 at different locations, the specific locations being a location A and a location B. To obtain the resident duration of the user A within the target area, it is necessary to make statistics on a sub-duration of the user A appearing at the location A and a sub-duration of the user A appearing at the location B, and the two sub-durations are added to obtain the resident duration of the user A within the target area 40.

It should be noted that the method for obtaining the resident duration of a user at each location may include: obtaining a first time value when the user reports first location information, then obtaining a second time value when the user reports second location information next time, and subtracting the first time value from the second time value as the resident duration of the user at a location corresponding to the first location information.

The preset duration threshold value may be set according to an actual situation, and may be specifically set according to a first preset duration. For example, if the first preset duration is 10 days, the preset duration threshold value may be set as 6 days, that is, when the sum of the resident durations of a user within the target area is 6 days or longer, the candidate user may be reserved; and if the sum of the resident durations of a user within the target area is only 5 days, the candidate user is deleted.

Obtain an appearance frequency of each of the candidate users in the target area, and screen to obtain at least one candidate user whose appearance frequency is greater than a preset frequency threshold value.

Specifically, all resident locations of each of the candidate users and all corresponding resident counts are obtained, the sum of counts of the candidate user appearing in at least one location within the target area is obtained, and a ratio of the sum of counts of the candidate user appearing in at least one location within the target area to all resident counts corresponding to all the locations is taken as an appearance frequency of the candidate user in the target area.

Figure 8:
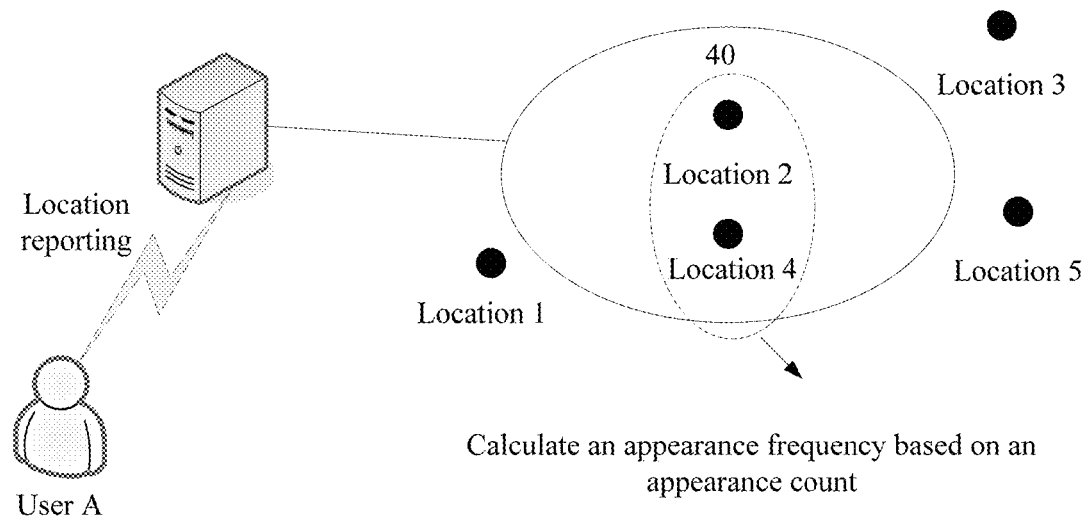
FIG. 8 is a schematic diagram of determining a resident frequency of a user based on a location reported by the user in the present application.

For example, referring to FIG. 8, all locations where a user B has resided are locations 1 to 5, wherein the user has appeared at the location 1 once, has appeared at the location 2 thrice, has appeared at the location 3 twice, has appeared at the location 4 for five times, and has appeared at the location 5 once. In other words, the user B has appeared at all the locations for 12 times. The location 4 and the location 2 in the foregoing locations 1 to 5 are within the target area, so the frequency of the user B appearing within the target area may be (5+3)/12=66%.

The preset frequency threshold value may be set according to an actual situation. For example, it may be set as 60%. In other words, if the frequency of a user appearing within the target area is greater than 60%, the candidate user will be reserved, and otherwise, the candidate user is deleted.

Figure 9A:
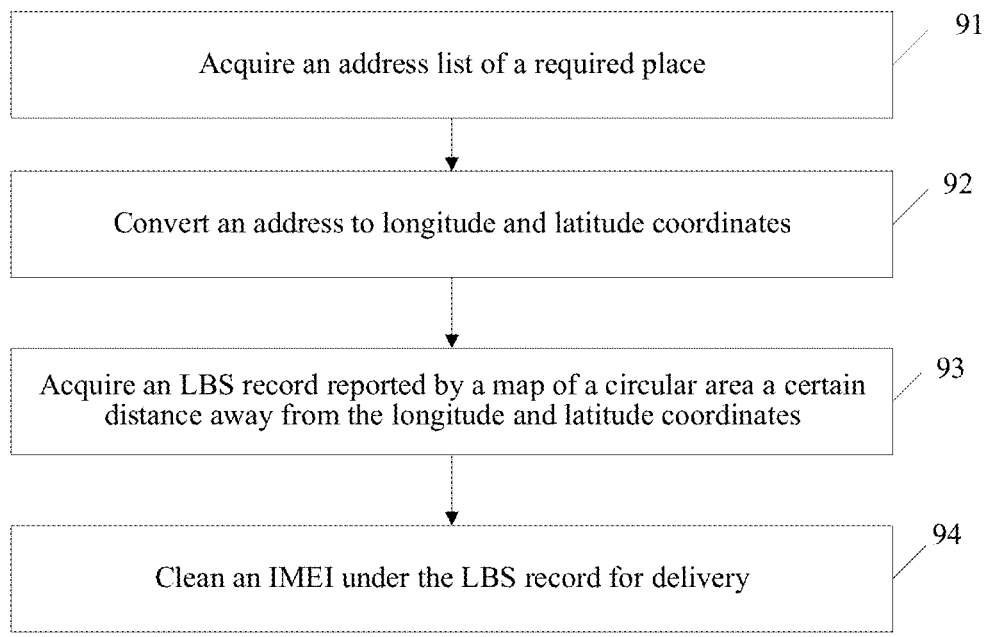
FIG. 9a is another flowchart of a target object selection method in the present application.

The following description with reference to FIG. 9a specifically includes the following steps.

Step S91: Acquire an address list of a required place.

Step S92: Convert an address to longitude and latitude coordinates (generally an 84-coordinate system).

Step S93: Acquire an LBS record reported by a map (e.g., a Tencent map) of a circular area a certain distance away from the longitude and latitude coordinates.

Step S94: Clean an IMEI under the LBS record for delivery.

Figure 10:
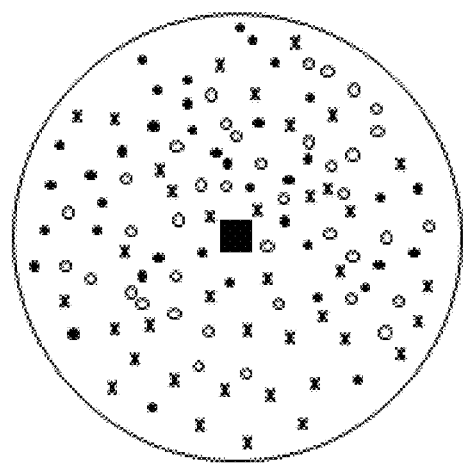
FIG. 10 is a schematic diagram of different types of users provided in a target area.

In the foregoing LBS-based data extraction process, there are several points to be processed: more mobile populations (passing through, handling business, etc.) may be acquired by this method; permanent populations near a locating point, but non-targeted users are acquired (e.g., nearby residents); and part of target users are not acquired by this method (e.g., using iOS phones/not using Tencent location service). For example, referring to FIG. 10, ● represents an obtained target population, ○ represents a target population that has not been obtained, and X represents a non-target population. The goal for data cleaning-up is to remove X as much as possible, and the goal of extension is to mine ○ as much as possible.

For more mobile populations, a hard appearance day threshold cutoff is adopted in actual operation, that is, the number of days for locating needs to be greater than or equal to m (preset duration threshold value), so that accidentally passing populations may be filtered out with a large probability.

For the permanent populations near the locating point, because they also appear frequently, other methods are needed for data clean-ups. Considering a possible colleague relationship chain among colleagues, this problem may be modeled as a graph problem.

Assumptions: There is sporadic colleague relationship chain data among colleagues, and in the LBS mining foundation, nodes in a colleague relationship should occupy a higher proportion.

Figure 11:
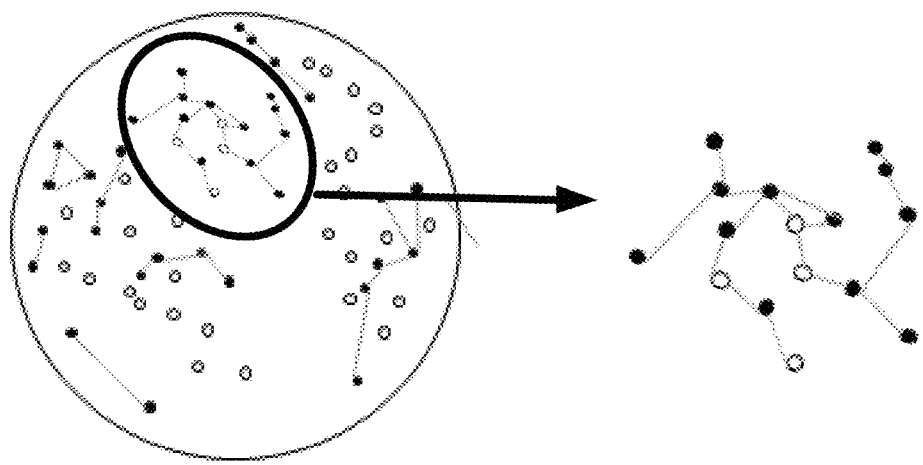
FIG. 11 is a schematic diagram of a connection relationship in a target area.

Logic inference: The colleague relationship in the model appears as a larger connected graph. For example, referring to FIG. 11, as shown on the left figure: possible representations of a graph model; right figure: larger connected graphs. From the graph model, the larger connected graphs are screened out and the smaller connected graphs are filtered out, so that a large probability of screening may be achieved.

Figure 9B:
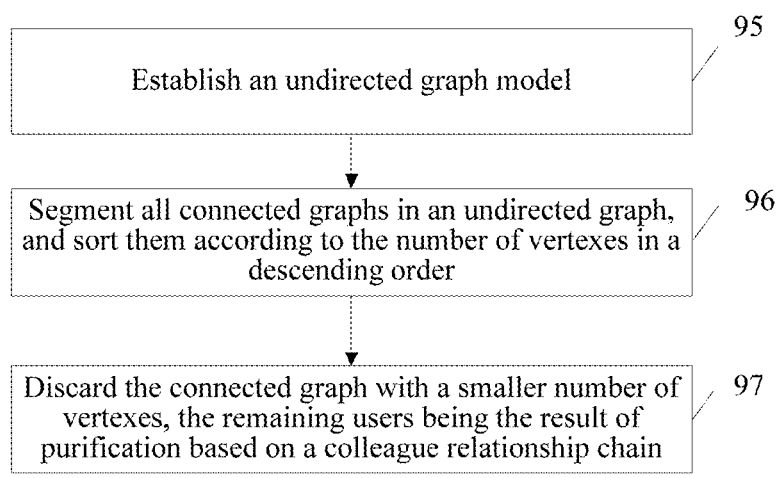
FIG. 9b is another flowchart of a target object selection method in the present application.

Based on the cleaning-up method of the colleague relationship chain, the method of includes the steps described in FIG. 9b.

Step S95: Add, on the basis of taking a user who has a hard appearance day threshold cutoff as a vertex, the colleague relationship chain of the user as an edge, and establish an undirected graph model.

Step S96: Segment all connected graphs in an undirected graph, and sort them according to the number of vertexes in a descending order, S1>S2>S3>S4, . . . .

Step S97: Observe the result, select an appropriate cutoff condition, and discard the connected graph with a smaller number of vertexes, the remaining users being the result of data clean-up based on a colleague relationship chain.

Further, for the result of data clean-up, a round of extraction of a colleague relationship chain of an unknown user is performed again, so as to expand the coverage of some people who have not reported location LBS.

It can be seen that by adopting the foregoing solution, a candidate user within a target area can be selected based on the location of the user, and a target user who has a social relationship is selected according to a social relationship chain of the candidate user, so as to send information to the selected target user. Thus, the target user can be selected within the target area based on the social relationship, thereby ensuring the accurate determination of a user group and improving the accuracy of information delivery.

Figure 12:
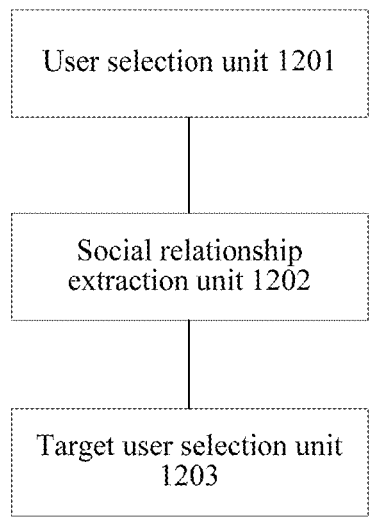
FIG. 12 is a structure diagram of a server of the present application.

The present application provides a server. As shown in FIG. 12, the server includes: a user selection unit 1201, being configured to select at least one candidate user meeting a first preset condition in a target area, wherein the first preset condition characterizing a user who has appeared in the target area; a social relationship extraction unit 1202, being configured to extract a social relationship chain of the at least one candidate user in the target area, wherein the social relationship chain including at least one related user who has a social relationship with the candidate user; and a target user selection unit 1203, being configured to select at least one target user from the target area based on the social relationship chain of the at least one candidate user, so as to send information to the at least one target user in the target area.

Here, the user selection unit 1201 is configured to obtain at least one piece of location information reported by each user in at least one user through a mobile terminal within a first preset duration; determine whether the user appears within the target area or not based on the at least one piece of location information corresponding to each of the users; and determine that the user is a candidate user meeting the first preset condition if the user appears within the target area.

The step of obtaining at least one location where each user in at least one user has resided within a first preset duration may be: receiving at least one piece of location information sent by each of the users through the mobile terminal within the first preset duration, and taking a location corresponding to the at least one piece of location information as at least one location where the user has resided within the first preset duration.

Specifically, at least one piece of location information sent by the user through the mobile terminal may be obtained by location based service (LBS), the LBS acquires location information (which may, for example, include longitude and latitude coordinates) of a user of a mobile terminal through a mobile operator network (i.e., a GSM network, or a CDMA network). At this time, a corresponding user identity obtained by a computer network may be an international mobile equipment identity (IMEI).

The first preset duration may be a duration set according to an actual situation. For example, the first preset duration may be 10 days or may be 1 month. In other words, location information received within this period of time and reported by the user is obtained, and locations where the user has appeared within this duration are determined according to these pieces of location information.

The foregoing target area may be a target area set by a manager according to a place of concern of the manager. The place of concern of the manager may be referred to as a POI: POI is an abbreviation of "Point of Interest", which is an information point of interest. Each POI may contain the following four aspects of information: location name, category, longitude and latitude of a location, and nearby shops. It will be appreciated that the longitude and latitude of a location in the target area may be a center point of the target area, such as, referring to FIG. 2, a center point 21 of a POI in FIG. 2. In addition, a certain coverage range can also exist, such as a coverage range 22 in the figure. A target shop 23 may also be provided in the coverage range.

The user selection unit 1201 is configured to compare the at least one piece of location information with the coverage range of the target area, and determine that the user appears within the target area if a piece of location information is within the coverage range of the target area. For example, referring to FIG. 3, a coverage range of a target area is 30, a user A reports 5 pieces of location information through a mobile terminal, namely locations 1 to 5. It can be seen from FIG. 3 that the locations 1 and 3 in the location information reported by the user A are within the coverage range 30, so it is determined that the user A is a candidate user.

The manner of selecting a candidate user is described in detail below based on a social relationship chain. The target user selection unit is configured to extract candidate users from the at least one candidate user one by one; and select a corresponding social relationship chain of the candidate user in at least one application, determine at least one related user based on the social relationship chain of the candidate user in the at least one application, and select a target user from the at least one related user based on at least one candidate user other than the extracted candidate users.

The social relationship chain is: at least one related user who has a social relationship with the candidate user. The social relationship may be one or more types of social relationships designated by a manager. For example, a user may have a friendship with colleagues, classmates, girlfriends, etc. The manager may follow up on the "colleagues" relationship. That is, the social relationship is designated as a colleague relationship.

The manner of obtaining a social relationship of a user may be: obtaining a tag set by a user for his/her friend, that is, taking the tag as a social relationship between the user and the friend; or, taking, according to a friend group in which a user joins in an application currently, the category of the friend group as a social relationship of the user.

Specifically, a candidate user stores an IMEI of the user on a server side, and when reporting LBS thereof, the candidate user reports the LBS and the IMEI associatively, that is, the server side can obtain the IMEI of the user while obtaining the LBS of the candidate user. Further, the server side also stores a corresponding account of the user when logging in at least one social application based on the IMEI of the user, and thus a corresponding social relationship chain of the user in at least one application can be known. For example, referring to FIG. 2, when a user A is at a location 1, the user reports the location 1 and the LBS of the user A and carries an IMEI to a server side. The server side determines, based on the IMEI of the user A, an application 1 in which the user A registers or logs, and acquires a friend relationship of the user A in the application 1, particularly at least one friend who has a target social relationship with the user, these friends being based on at least one related user of the candidate user A.

Further, the process of selecting a target user may include: comparing the selected related user with candidate users, wherein the related user among the candidate users may be taken as a candidate user.

Figure 3:
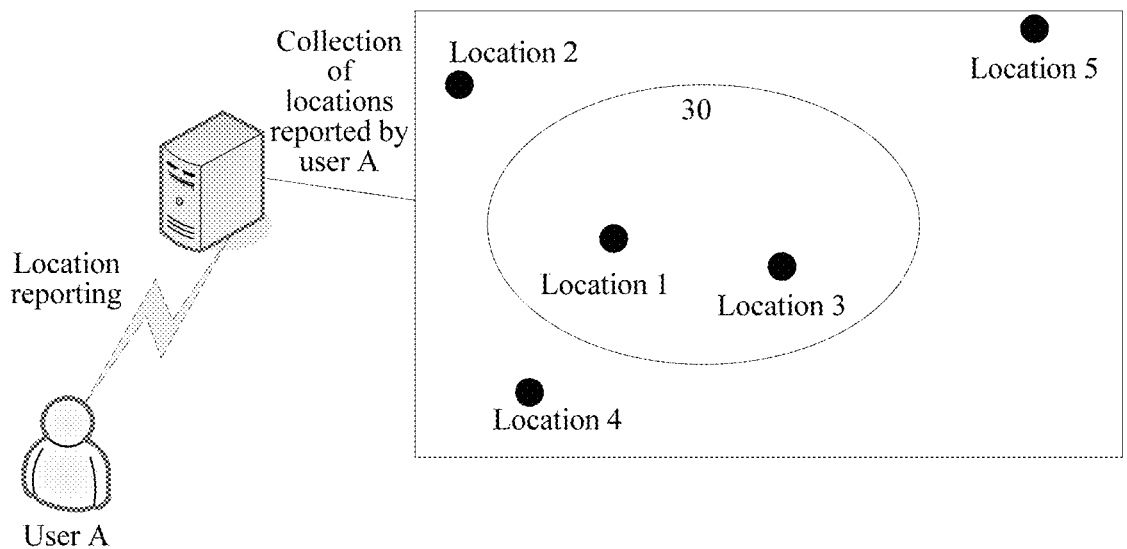
FIG. 3 is a schematic diagram of determining a candidate user based on a location reported by the user in the present application.

For example, referring to FIG. 3, candidate users within the target area 30 are users 1 to 10. The user 1 is taken as an example. The user 1 has multiple related users, the candidate users 2, 4, 6, and 10 among the candidate users 2 to 10 are intersected with the related users of the user 1, and so on, target users selected from the candidate users 1 to 10 may be the users 2, 4, 6, 8, and 10.

Further, the users who have more social relationships are selected from the foregoing target users as final target users as follows.

The target user selection unit is configured to take the extracted candidate users as vertexes; extract a social relationship chain in at least one application for the extracted candidate users, select at least one related user who has a social relationship with the candidate users based on the social relationship chain, and select a user, matching with the at least one candidate user, in the at least one related user as a first target user; take the at least one first target user as at least one related vertex, establish a connection with the vertex, take the connection as at least one edge, and so on, until at least one connection relationship which is established based on the social relationship chain of all candidate users and has at least one vertex and at least one corresponding edge is completed; and select a connection relationship in which the total number of vertexes and related vertexes exceeds a preset number threshold value from the at least one connection relationship, and take a first target user corresponding to the vertexes and the related vertexes in the selected connection relationship as the at least one target user.

Figure 4:
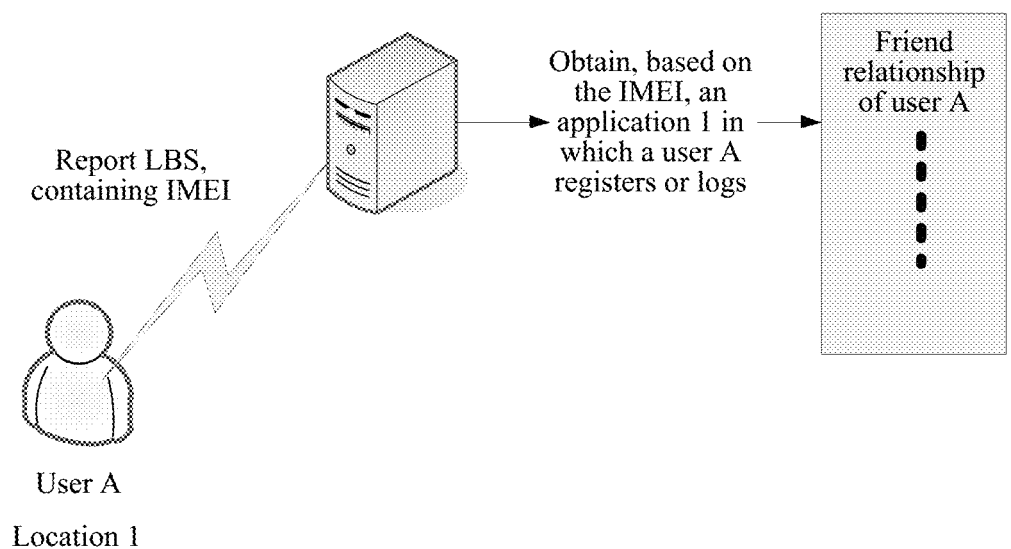
FIG. 4 is a schematic diagram of acquiring a social relationship of a user in the present application.

For example, referring to FIG. 4, an extracted candidate user 1 is taken as a vertex, the candidate user 1 has related users with a social relationship, multiple first target users, namely users 2, 3 and 5, are selected from the related users based on other candidate users, a connection relationship is established between the users 2, 3 and 5 and the vertex respectively, and the users and the vertex are connected to form multiple edges. The user 2 is then taken as a vertex, and also has multiple first target users namely users 3, 4 and 8, which establishes a connection relationship with the user 2 to form multiple edges, and so on, so as to obtain connection relationships obtained by taking the users 1 to 8 as a vertex separately. After multiple connection relationships are obtained, a connection relationship in which the number of vertexes exceeds a preset number threshold value is selected, and all first target users in the selected connection relationship are taken as final selected target users.

Thus, it is possible to obtain target users in a closer social relationship to deliver information to.

Figure 13:
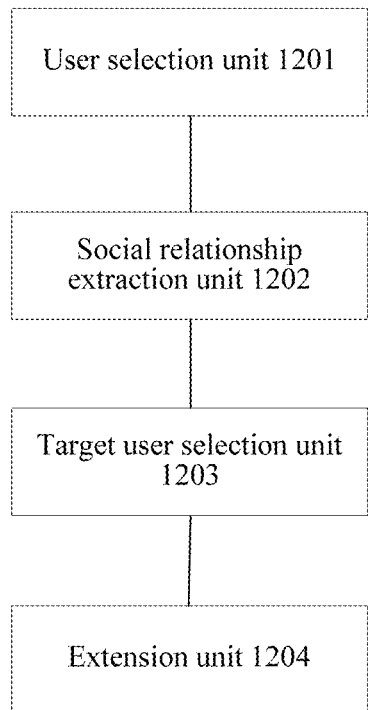
FIG. 13 is another structure diagram of a server of the present application.

The present embodiment also further extends to obtain more extended users having the same social relationship based on the social relationship of the selected target user. As shown in FIG. 13, the server further includes an extension unit 1204, being configured to select, based on at least one target user and a social relationship chain of the at least one target user in at least one application, extended users who have a social relationship with the target user, compare the extended users with the at least one candidate user, select at least one extended user different from the candidate user as an extended target user, and send information to the extended target user.

It should be pointed out that the manner of selecting extended users based on a social relationship of a target user is the same as the foregoing manner, and no further details are provided herein. When the extended users are further compared with candidate users, an extended user different from the candidate users is selected as an extended target user during user selection.

Because the extended user cannot be acquired by reporting a location, the user may be extended by having a social relationship with the target user. Thus, after the target user is determined, the extended user whose social relationship meets the requirement can be further extended. Thus, the demand of user extension can be met.

It can be seen that by adopting the foregoing solution, a candidate user within a target area can be selected based on the location of a user, and a target user who has a social relationship is selected according to a social relationship chain of the candidate user, so as to send information to the selected target user. Thus, the target user can be selected within the target area based on the social relationship, thereby ensuring the accurate determination of a user group and improving the accuracy of information delivery.

On the basis of the processes described above, the present embodiment describes the screening of the selected candidate users, and after determining that the user is a candidate user meeting a first preset condition, the method further includes at least one of the following steps.

First, the user selection unit is configured to obtain a resident duration of each of the candidate users in the target area, and screen to obtain at least one candidate user whose resident duration is greater than a preset duration threshold value.

The method for screening based on a resident duration specifically includes: obtaining each resident sub-duration of each of the candidate users in the target area, and adding all the resident sub-durations to obtain a resident duration.

Specifically, referring to FIG. 5, a user A appears within a target area 40 at different locations, the specific locations being a location A and a location B. To obtain the resident duration of the user A within the target area, it is necessary to make statistics on a sub-duration of the user A appearing at the location A and a sub-duration of the user A appearing at the location B, and the two sub-durations are added to obtain the resident duration of the user A within the target area 40.

It should be noted that the method for obtaining the resident duration of a user at each location may include: obtaining a first time value when the user reports first location information, then obtaining a second time value when the user reports second location information next time, and subtracting the first time value from the second time value as the resident duration of the user at a location corresponding to the first location information.

The preset duration threshold value may be set according to an actual situation, and may be specifically set according to a first preset duration. For example, if the first preset duration is 10 days, the preset duration threshold value may be set as 6 days, that is, when the sum of the resident durations of a user within the target area is 6 days or longer, the candidate user may be reserved; and if the sum of the resident durations of a user within the target area is only 5 days, the candidate user is deleted.

The user selection unit is configured to obtain an appearance frequency of each of the candidate users in the target area, and screen to obtain at least one candidate user whose appearance frequency is greater than a preset frequency threshold value.

Specifically, all resident locations of each of the candidate users and all corresponding resident counts are obtained, the sum of counts of the candidate user appearing in at least one location within the target area is obtained, and a ratio of the sum of counts of the candidate user appearing in at least one location within the target area to all resident counts corresponding to all the locations is taken as an appearance frequency of the candidate user in the target area.

For example, referring to FIG. 6, all locations where a user B has resided are locations 1 to 5, wherein the user has appeared at the location 1 once, has appeared at the location 2 thrice, has appeared at the location 3 twice, has appeared at the location 4 for five times, and has appeared at the location 5 once. In other words, the user B has appeared at all the locations for 12 times. The location 4 and the location 2 in the foregoing locations 1 to 5 are within the target area, so the frequency of the user B appearing within the target area may be (5+3)/12=66%.

The preset frequency threshold value may be set according to an actual situation. For example, it may be set as 60%. In other words, if the frequency of a user appearing within the target area is greater than 60%, the candidate user will be reserved, and otherwise, the candidate user is deleted.

It can be seen that by adopting the foregoing solution, a candidate user within a target area can be selected based on the location of the user, and a target user who has a social relationship is selected according to a social relationship chain of the candidate user, so as to send information to the selected target user. Thus, the target user can be selected within the target area based on the social relationship, thereby ensuring the accurate determination of a user group and improving the accuracy of information delivery.

The present application may also provide a server, including a processor and a communication interface.

The processor is configured to select at least one candidate user meeting a first preset condition in a target area, wherein the first preset condition characterizing a user who has appeared in the target area; extract a social relationship chain of the at least one candidate user in the target area, wherein the social relationship chain including at least one related user who has a social relationship with the candidate user; and select at least one target user from the target area based on the social relationship chain of the at least one candidate user, so as to send information to the at least one target user in the target area.

The communication interface is configured to send information.

Further, functions of the processor in the foregoing server may be corresponding to the user selection unit, the social relationship extraction unit, the target user selection unit, and the extension unit in the foregoing embodiments.

A unit or module as described in the present disclosure may refer to one more software programs. The memory of the sever computer may be configured to store a software program and the corresponding module. The processor of the server runs the software program and unit/module stored in the memory, to implement various functional applications and data processing of the unit or module. The memory of the server may mainly include a program storage area and a data storage area. The program storage area may store an operating system, an application program required by at least one function (such as a sound playback function and an image display function), and the like. The data storage area may store data (such as audio data and an address book) created according to use of the terminal, and the like. In addition, the memory may include a high speed random access memory, and may further include a non-volatile memory, such as at least one magnetic disk storage device, a flash memory, or other volatile solid-state storage devices. Correspondingly, the memory of the server may further include a memory controller, to provide access of the processor and the input unit to the memory.

In some embodiments, a functional unit or module may include software and hardware components. The memory of the server may be configured to store one or more software programs. The processor of the server may run the software programs stored in the memory. Together with the corresponding hardware components, the processor may implement various functional applications and data processing of the unit or module.

The present application provides a server, including: a processor, and a memory being configured to store a computer program capable of running on the processor.

The processor is configured to perform, when running the computer program, the foregoing described method steps. No further details are repeated herewith.

A person of ordinary skill in the art may understand that all or part of the steps for implementing the foregoing method embodiments may be accomplished by instructing related hardware through a program, the foregoing program may be stored in a computer-readable storage medium, and the program performs, when being executed, the steps in the foregoing method embodiments. The foregoing storage medium includes: various media capable of storing program codes, such as a mobile storage device, a read-only memory (ROM), a random access memory (RAM), a magnetic disk or an optical disc. The present application provides a computer storage medium, storing a computer-executable instruction, the computer-executable instruction, when being executed, implementing the foregoing described method steps.

The foregoing descriptions are merely specific implementation manners of the present application, but the protection scope of the present application is not limited thereto. Any person skilled in the art may easily think of variations or replacements within the technical scope disclosed by the present application. The variations or replacements should be covered by the protection scope of the present application. Therefore, the protection scope of the present application should be determined by the protection scope of the claims.

It should be noted that the terms "include", "comprise", and any variants thereof are intended to cover a non-exclusive inclusion. Therefore, in the context of a process, method, article, or device that includes a series of elements, the process, method, article, or device not only includes such elements, but also includes other elements not specified expressly, or may include inherent elements of the process, method, article, or device. Unless otherwise specified, an element limited by "include a/an . . . " does not exclude other same elements existing in the process, the method, the article, or the device that includes the element.

The sequence numbers of the present application are merely for the convenience of description, and do not imply the preference among the embodiments.

By means of the description of the foregoing implementation manner, those skilled in the art may clearly understand that the method according to the foregoing embodiment may be implemented by means of software plus a necessary general hardware platform. Of course, the hardware may also be used, but in many cases, the former is a better implementation manner. Based on this understanding, the essence of the technical solution or parts making contributions to the existing technology may be embodied in the form of a software product, the computer software product is stored in a storage medium (such as an ROM/RAM, a magnetic disk, and an optical disc), including a plurality of instructions used for enabling one terminal device (which may be a mobile phone, a computer, a server, an air conditioner, or a network device) to perform the method according to each embodiment of the present application.

The foregoing descriptions are merely preferred embodiments of the present application but are not intended to limit the patent scope of the present application. Any equivalent modifications made to the structures or processes based on the content of the specification and the accompanying drawings of the present application for direct or indirect use in other relevant technical fields shall also be encompassed in the patent protection scope of the present application.

What is claimed is:

1. A target object selection method, applied to a server, comprising:
    selecting candidate users meeting a first condition in a target area based on location information reported by user terminals using location based service, the first condition characterizing a time duration within which a user has appeared in the target area;
    after selecting the candidate users who appeared in the target area within the time duration based on the location information, extracting social relationship chains of the candidate users in the target area, and obtaining connection relationships for all candidate users whose corresponding social relationship chain includes at least one other candidate user, including: for each candidate user represented by a candidate vertex, determining that a currently-being-processed candidate vertex has at least one related vertex and establishing a connection between each related vertex and the candidate vertex, each related vertex representing one other candidate user that included in the social relationship chain of the candidate user currently being processed, wherein the candidate user currently being processed corresponds to candidate vertex A, vertex B corresponding to the candidate user B who meets the first condition in the target area and also is included in the social relationship chain is the related vertex of candidate vertex A, and vertex C corresponding to the candidate user C who meets the first condition in the target area but is not included in the social relationship chain is not the related vertex of candidate vertex A; and
    obtaining a connection relationship corresponding to the candidate user currently being processed, the connection relationship including connections among the candidate vertex and all related vertex;
    selecting, among connection relationships of all candidate users, a connection relationship in which the total number of vertexes exceeds a number threshold value, and taking candidate users in the selected connection relationship as target users, each target user being one of the candidate users that also appears in a social relationship chain of another candidate user; and
    sending information to the target user.

2. The method according to claim 1, further comprising:
    selecting, based in the target user and a social relationship chain of the target user in at least one application, extended users who have a social relationship with the target user; and
    comparing the extended users with the candidate users, selecting at least one extended user different from the candidate users as an extended target user, and sending information to the extended target user.

3. The method according to claim 1, wherein selecting the candidate user meeting a first condition in a target area comprises:
    obtaining at least one piece of location information reported by each user through a mobile terminal within the time duration;
    determining whether the user appears within the target area based on the at least one piece of location information corresponding to each of the users; and
    determining that the user is a candidate user meeting the first condition upon determining that the user appears within the target area within the time duration.

4. The method according to claim 3, wherein after determining that the user is the first candidate user meeting the first condition, the method further comprises:
    obtaining a resident duration of each of the candidate users in the target area, and screening to identify at least one candidate user whose resident duration is greater than a duration threshold value, the resident duration being a time period when a candidate user appears within the target area within the time duration.

5. The method according to claim 4, further comprising:
    determining each resident sub-duration of each of the candidate users in the target area, and adding all the resident sub-durations to obtain a resident duration, each sub-duration indicating a time period when a candidate user appears in a different location within the target area in the time duration.

6. The method according to claim 3, wherein after determining that the user is the first candidate user meeting the first condition, the method further comprises:
    obtaining an appearance frequency of each of the candidate users in the target area, and screening to identify at least one candidate user whose appearance frequency is greater than a frequency threshold value.

7. The method according to claim 6, further comprising:
    determining all locations of appearances for each of the candidate users and counts of times of the appearances corresponding to each of all the locations, the all locations including at least one location within the target area and at least one location outside the target area;
    obtaining the sum of counts of the candidate user appearing in at least one location within the target area; and
    taking a ratio of the sum of counts of the candidate user appearing in at least one location within the target area to a total count of the counts corresponding to all the locations as an appearance frequency of the candidate user in the target area.

8. A server, comprising:
    a memory; and
    a processor coupled to the memory and configured to:
    select candidate users meeting a first condition in a target area based on location information reported by user terminals using location based service, the first condition characterizing a time duration within which a user has appeared in the target area;

after the candidate users who appeared in the target area within the time duration based on the location information are selected, extract social relationship chains of the candidate users in the target area, and obtaining connection relationships for all candidate users whose corresponding social relationship chain includes at least one other candidate user, including: for each candidate user represented by a candidate vertex, determining that a currently-being-processed candidate vertex has at least one related vertex and establishing a connection between each related vertex and the candidate vertex, each related vertex representing one other candidate user that included in the social relationship chain of the candidate user currently being processed, wherein the candidate user currently being processed corresponds to candidate vertex A, vertex B corresponding to the candidate user B who meets the first condition in the target area and also is included in the social relationship chain is the related vertex of candidate vertex A, and vertex C corresponding to the candidate user C who meets the first condition in the target area but is not included in the social relationship chain is not the related vertex of candidate vertex A; and obtaining a connection relationship corresponding to the candidate user currently being processed, the connection relationship including connections among the candidate vertex and all related vertex;

select, among connection relationships of all candidate users, a connection relationship in which the total number of vertexes exceeds a number threshold value, and taking candidate users in the selected connection relationship as target users, each target user being one of the candidate users that also appears in a social relationship chain of another candidate user; and send information to the target user in the target area.

9. The server according to claim 8, wherein the processor is further configured to:

select, based on the target user and a social relationship chain of the target user in at least one application, extended users who have a social relationship with the target user;

compare the extended users with the candidate users, select at least one extended user different from the candidate users as an extended target user; and send information to the extended target user.

10. The server according to claim 8, wherein the processor is further configured to:

obtain at least one piece of location information reported by each user through a mobile terminal within the time duration;

determine whether the user appears within the target area based on the at least one piece of location information corresponding to each of the users; and determine that the user is a candidate user meeting the first condition upon determining that the user appears within the target area within the time duration.

11. The server according to claim 10, wherein the processor is further configured to:

obtain a resident duration of each of the candidate users in the target area, and screen to obtain at least one candidate user whose resident duration is greater than a duration threshold value, the resident duration being a time period when a candidate user appears within the target area within the time duration.

12. The server according to claim 11, wherein the processor is further configured to:

obtain each resident sub-duration of each of the candidate users in the target area, and add all the resident sub-durations to obtain a resident duration, each sub-duration indicating a time period when a candidate user appears in a different location within the target area in the time duration.

13. The server according to claim 10, wherein the processor is further configured to:

obtain an appearance frequency of each of the candidate users in the target area, and screen to obtain at least one candidate user whose appearance frequency is greater than a frequency threshold value.

14. The server according to claim 13, wherein the processor is further configured to:

obtain all locations of appearances for each of the candidate users and counts of times of the appearances corresponding to all the locations, the all locations including at least one location within the target area and at least one location outside the target area, obtain the sum of counts of the candidate user appearing in at least one location within the target area, and take a ratio of the sum of counts of the candidate user appearing in at least one location within the target area to a total count of the counts corresponding to all the locations as an appearance frequency of the candidate user in the target area.

15. A non-transitory storage medium storing computer executable program instructions, when being executed by a processor, the program instructions cause the processor to perform:

selecting candidate users meeting a first condition in a target area based on location information reported by user terminals using location based service, the first condition after selecting the candidate users who appeared in the target area within the time duration based on the location information, extracting social relationship chains of the candidate users in the target area, and obtaining connection relationships for all candidate users whose corresponding social relationship chain includes at least one other candidate user, including: for each candidate user represented by a candidate vertex, determining that a currently-being-processed candidate vertex has at least one related vertex and establishing a connection between each related vertex and the candidate vertex, each related vertex representing one other candidate user that included in the social relationship chain of the candidate user currently being processed, wherein the candidate user currently being processed corresponds to candidate vertex A, vertex B corresponding to the candidate user B who meets the first condition in the target area and also is included in the social relationship chain is the related vertex of candidate vertex A, and vertex C corresponding to the candidate user C who meets the first condition in the target area but is not included in the social relationship chain is not the related vertex of candidate vertex A; and obtaining a connection relationship corresponding to the candidate user currently being processed, the connection relationship including connections among the candidate vertex and all related vertex;

selecting, among connection relationships of all candidate users, a connection relationship in which the total number of vertexes exceeds a number threshold value, and taking candidate users in the selected connection relationship as target users, each target user being one of the candidate users that also appears in a social relationship chain of another candidate user; and sending information to the target user.

16. The storage medium according to claim 15, wherein the program instructions further cause the processor to perform:

selecting, based in the target user and a social relationship chain of the target user in at least one application, extended users who have a social relationship with the target user; and comparing the extended users with the candidate users, selecting at least one extended user different from the candidate users as an extended target user, and sending information to the extended target user.

17. The storage medium according to claim 15, wherein the selecting the candidate user meeting a first condition in a target area comprises:

obtaining at least one piece of location information reported by each user through a mobile terminal within the time duration;

determining whether the user appears within the target area or not based on the at least one piece of location information corresponding to each of the users; and determining that the user is a candidate user meeting the first condition upon determining that the user appears within the target area within the time duration.

* * * * *